July 28, 1959    E. S. FERGUS    2,897,308
SNAP ACTING SWITCH
Filed May 17, 1956
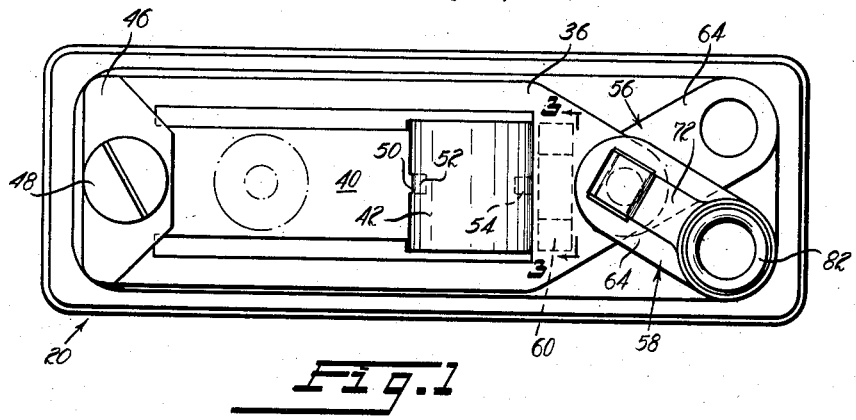
Fig.1
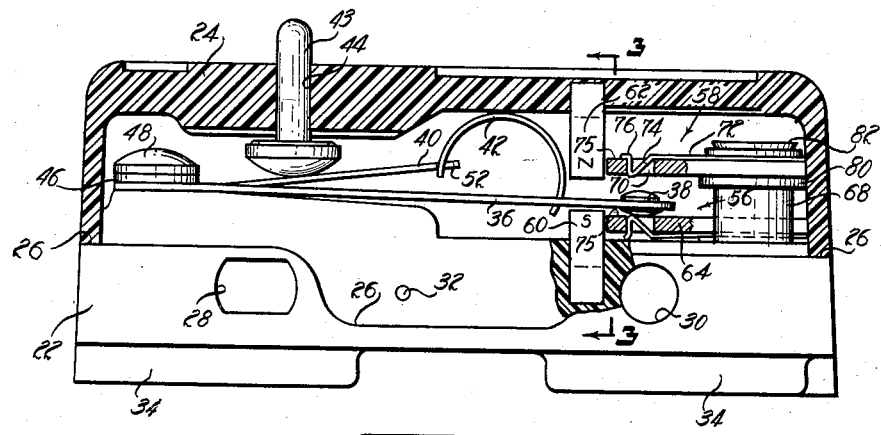
Fig.2
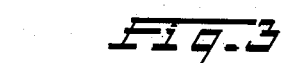
Fig.3
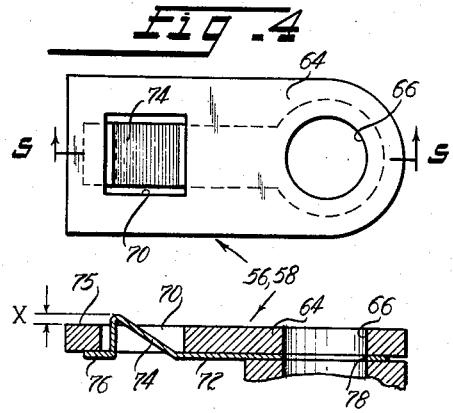
Fig.4
Fig.5
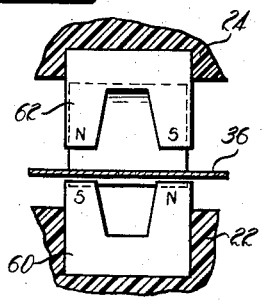
INVENTOR
EDWARD S. FERGUS
BY Strauch, Nolan & Neale
ATTORNEYS ована
United States Patent Office 2,897,308
Patented July 28, 1959

2,897,308

SNAP ACTING SWITCH

Edward S. Fergus, Worthington, Ohio, assignor, by mesne assignments, to Robertshaw-Fulton Controls Company, Greensburg, Pa., a corporation of Delaware Application May 17, 1956, Serial No. 585,412

3 Claims. (Cl. 200—67)

This invention relates to a snap acting device and particularly to a precision snap acting switch for high vibration applications such as military aircraft, missiles, tanks and the like.

A typical snap switch has a moving contact carrying member, and means for operating that member with a snap action to move the contact on it into and out of engagement with one or more fixed contacts thereby controlling electrical circuitry. Such snap switches have been used in aircraft, guided missiles and tanks where continuity of electrical contact and precise control of switch performance characteristics are of prime importance. However, difficulties have been encountered in such switch installations due to the condition of extreme vibration, shock and other forces that are inherent in machines of this character. Such vibration or shock causes the movable contact carrying member to vibrate so that contact is broken between the movable and fixed switch contacts causing arcing which rapidly destroys the contacts and adversely affects the switch's performance. Excessive vibration also decreases contact pressure and prevents effective control of it. This decreases the electrical load a switch of particular size and design can carry under high vibration conditions, since the switch current and voltage capacity is proportional to contact pressure.

The forces to which a switch may be subjected are broken down into two basic categories—shock and vibration. Shock is the rapid deceleration of a mass and is measured in "G's." A typical test for this is to drop the mass from a given height onto an immovable object. The height defines the number of "G's" the mass is subjected to. The higher the number of G's the better the switch is for high vibration uses.

Vibration is the excursion within two limits of travel and while it can be measured in "G's" it is usually measured in distance of excursion and time. A typical test for this is to mount the mass on a vibration table and move the table between two extremes of distance in a given time. By varying the time of excursion and the distance the effect of harmonic vibration as well as the shock force can be determined. The creation of harmonic motion may have a serious effect on switch performance, and avoidance thereof is desirable.

It is a primary object of the present invention to provide a precision switch in which the movable contact carrying member will withstand a high number of G's external force so that the movable switch contact will maintain continuity of electrical contact with its cooperating fixed contact under extreme conditions of vibration or shock that ordinarily would cause the contacts to separate in switches constructed according to prior designs.

It is another object of the present invention to provide a precision snap acting switch incorporating means for exerting a high attractive (or repulsive) force on the movable contact carrying member urging it towards its cooperating fixed contact and preventing separation of the contacts under high vibration or shock; and to provide such a means which permits, and in no way interferes with the intended precision snap action of the switch.

It is still another object of the present invention to provide a novel simplified magnetic arrangement for a switch including a movable contact carrying member of magnetic material and magnet means for retaining said member so that the movable contact on it remains in continuous engagement with the cooperating fixed contact under high G forces due to vibration and shock.

It is still a further object of the present invention to provide in a snap switch having a relatively elongated movable contact carrying blade a novel arrangement in which an attractive force is exerted on the movable blade member so as to prevent formation of harmonic vibrations in that blade member.

It is difficult to assure elimination of all movable contact flutter and complete continuous contact under extreme conditions of vibration, even with a switch having an arrangement for restraining motion of the movable contact and assuring extra high contact pressures as hereinafter disclosed. Hence, it is sometimes important to supplement the above-mentioned arrangement for restraining motion of the movable contact with a further means to eliminate contact interruption, which causes destructive arcing and switch malfunction.

Accordingly, it is also a principal object of the present invention to provide a precision snap acting switch having a differential between the movement required to initiate electrical current conduction and the total movement of the movable switch contact so that any tendency of the switch contacts to separate under vibration or shock will not cause a break in contact continuity or an interruption in current flow.

It is still another object of the present invention to provide a novel fixed contact arrangement incorporating a heavy fixed contact bar and a flexible leaf contact of high conductivity spring material that can follow the movable contact when it separates from the fixed contact bar, thereby preventing current interruption. It is a related object of the present invention to provide such a novel improved fixed contact construction including a main contact bar which acts as a definite stop for the movable contact thereby providing good contact travel control, and further includes a flexible leaf contact that can be formed to predetermined size so that the manufacturer can definitely control the extent of contact follow-up by the leaf spring contact, and control the spacing between such leaf contacts in a double pole switch. It is a further related object of this invention to provide such a flexible leaf spring and bar contact which permits good production control of tolerances and switch characteristics according to the rigid specifications typical of "precision switches" as defined by the precision snap switch industry.

It is still another object of the present invention to provide a snap switch which has high contact pressures permitting increased current loading for a given switch size, and in which arcing tendencies are greatly reduced.

It is still a further object of the present invention to provide very efficient means for adapting a switch to high vibration installations with said means being of relatively simple and low cost construction and adaptable to all of the best precision snap switches now in use in the United States with a minimum of change in switch design and production tooling.

Further objects and advantages of the present invention will be apparent from the following description and claims, reference being had to the accompanying drawings wherein a preferred form of the invention is clearly shown.

In the drawings:

Figure 1 is a plan view of a snap action switch embodying the present invention with the switch cover removed to show the switch operating parts more clearly;

Figure 2 is a side view of the snap acting switch in Figure 1 with the switch cover being shown in cross section to more clearly illustrate the relationship of the operating parts;

Figure 3 is a fragmentary sectional view along line 3—3 in Figures 1 and 2, showing the arrangement of the magnets and movable contact carrying blade in the switch of this invention;

Figure 4 is a top view of the novel fixed contact construction according to the present invention; and Figure 5 is a cross sectional view along line 5—5 in Figure 4.

Referring more particularly to Figures 1 and 2 of the drawings, the numeral 20 generally designates a switch according to the present invention comprising a generally rectangular base member 22 and cover 24, both usually formed of a moldable dielectric material. The side walls of the base 22 are provided with a suitable shoulder 26 against which the lower edge of the cover 24 may rest when it is applied to the base. Base 22 is provided with a pair of transversely extending mounting holes 28 and 30 through which screws or similar fastening devices may extend to mount the switch for use, and one or more small holes 32. The cover 24 is provided with one or more openings (not shown) similar to hole 32 in the switch base and in registry with opening 32 for reception of a wire or pin passing through these holes to retain the cover 24 and base 22 in assembled relationship. The base 22 includes reinforcing ribs 34 that also serve to insulate the connectors attached to the switch contact posts, in a manner well known in the art.

The snap switch assembly comprises a flexible leaf-like actuated blade member 36 carrying at its free end a movable contact 38, a flexible actuating blade member 40, and an arcuate spring 42 interconnecting said actuating member 40 and actuated member 36. Switch blades 36 and 40 may be integrally formed as shown in Figure 1 (or separately formed if desired) and are secured at one end to the base 22 by a clamp bar 46 and a screw or rivet 48 which is received in a suitable bore extending vertically through base 22. The lower end of screw 48 serves as, or is connected to, a connector means for wiring, in a conventional manner known in the art.

To effect operational alignment of the operating members 40, 42 and 36, the arcuate spring 42 is provided adjacent each end with small rectangular apertures 50 which respectively receive a tongue 52 projecting from the end of the actuating member 40 and a tongue 54 similarly projecting from the actuated member 36 in a manner that will be apparent from Figures 1 and 2. In the disclosed embodiment, the actuating member 40 is biased upwards towards the actuator button 43 as shown in Figure 2, whereby the arcuate spring 42 normally urges the actuated blade 36 downwardly into engagement with a first fixed contact shown generally at 56. The flexible actuated member 36 is moved to open the lower contact 56 and effect engagement of moving contact 38 with an upper fixed contact generally indicated at 58 by depressing the actuator push button 43 which is mounted for reciprocating movement in bore 44 in cover 24. The button 43 moves actuating member 40 until it passes through a critical position at which the spring 42 suddenly changes the direction of force applied to the free end of the blade 36 and throws it upward with a fast snap action so that contact 38 moves from contact 56 to 58. When button 43 is released, blade 36 and contact 38 are returned to normal position with a similar snap action.

A complete description of the above-described snap acting switch device will be found in United States Letters Patent to E. F. Kohl No. 2,558,219, issued June 26, 1951. This form of switch operating mechanism is selected for illustration and not for the purpose of limitation; and it is within the concept of the present invention to operate the switch in other ways and to incorporate in other types of switches my novel switch inventions which will now be described.

Referring particularly to Figures 2 and 3, the actuated blade member 36 carrying the movable contact 38 is made of a magnetic conductive material, such as magnetic stainless steel. As will be apparent from Figures 2 and 3, a magnet 60 is securely embedded in a recess in the switch base 22 by an interference fit, or adhesive, or like means. This magnet 60 is preferably U-shaped with legs forming a north and south pole respectively. In a double throw switch like that disclosed in the drawings, a second U-shaped magnet 62 is similarly mounted in a recess in switch cover 24. It has been found that best results are obtained when the upper and lower magnets are arranged with north and south poles respectively opposite to each other as in Figure 3, rather than with like poles opposed. The magnets may be of rectangular bar shape rather than of U-construction, but the U-shape has been found preferable.

When the stainless steel actuated blade 36 is in downward normally closed position as in Figure 2, it is in close proximity to the lower magnet 60 which exerts a continuous strong attractive force on it, thereby urging the moving contact 38 against the lower fixed contact 56 with a high contact pressure. Similarly, when operating button 43 is depressed to snap blade 36 into upward position, the blade 36 is then in close proximity to magnet 62 which exerts a high attractive force on it urging contact 38 into engagement with upper fixed contact bar 58 with a high contact pressure. This attractive force on the blade 36 restrains it from movement or flutter under vibration or shock and keeps the movable contact in engagement with fixed contact 56 or 58 as intended.

The above-described magnetic arrangement effectively solves the problem of controlling contact pressure and maintaining it at high levels even under very high vibration or shock. Since the amount of contact pressure controls the current and voltage load capacity for a switch of given size, this novel magnetic arrangement makes it possible to put a considerably higher electrical load through a given size switch and thereby widens its industrial applications.

This new switch arrangement also greatly minimizes current interruption and arcing, even under excessive vibration. Snap acting switches embodying the described construction disclosed in Figures 1 to 3 have withstood thirty G's of force under vibration without adversely affecting switch performance. This is a great improvement over prior snap switches which heretofore have been unable to perform well at more than 15 G's force due to vibration. Moreover, even if there is a tendency for contact separation under severe vibration, the described magnetic arrangement inhibits the separating movement of the contact blade at its inception, keeps it to a minimum, and eliminates "float" of the moving contact with respect to the fixed contact. This in turn greatly minimizes arcing which is most severe under conditions of initial contact break or contact float. This magnetic switch arrangement also tends to prevent the formation of harmonic vibrations in the actuated movable contact carrying member thereby eliminating or minimizing the particularly harmful effects of that type of vibration.

To supplement the above-described restraining action of the novel magnetic arrangement of this invention, and eliminate contact interruption and destructive arcing, the preferred switch combination for extreme vibration installations incorporates my novel contacts 56 and 58 which are best shown in Figures 2, 4 and 5. (Contacts 56 and 58 are identical.) Contact 58 comprises a main relatively heavy contact bar 64 of highly conductive material such as copper, and preferably has an inlay of silver. It also has a circular aperture 66 at one end for cantilever mounting on a switch contact post 68. At its free end which is engageable with the moving contact 38, the bar 64 is provided with a rectangular aperture 70. A leaf spring secondary contact member 72 made of highly conductive spring silver is provided on one side of bar 64, and has at its end a generally V-shaped protrusion 74 which extends through aperture 70 in bar 64. The end 76 of secondary contact member 72 limits the movement of V-shaped section 74 in one direction, and section 74 is formed so that it protrudes a predetermined distance $x$ beyond the contact surface 75 of bar 64, which is disposed towards the moving contact 38 in the switch assembly. Leaf spring contact 72 is also provided with an aperture 78 so that the contact 58, comprising parts 64 and 72, can be mounted on a contact post such as 68.

The upper contact assembly 58 rests on a washer 80 disposed on a reduced upper section of post 68, and is held in place by a spun flange or like means 82 at the upper end of the post 68. The lower contact 56 is similarly mounted on a shorter contact post. Both contact posts are suitably provided with external switch connections for wiring. The described contact posts are conventional, and other contact mounting arrangements can be used with the new improved contacts 56 and 58 of this invention.

Referring to Figure 2, when the fixed contact is not engaged by the movable contact 38 the V-shaped protrusion on the flexible contact 72 extends beyond the face of the contact bar 64, as in contact assembly 58 in Figure 2. But, when the movable contact 38 is in engagement with the fixed contact, then the flexible leaf 72 yields readily so that the moving contact 38 directly engages the main contact bar 64, as in contact assembly 56 in Figure 2. Bar 64 carries the electrical load at all times, excepting for very short intervals, and provides a limit for travel of the moving contact 38. If the switch should be subjected to extreme vibration so that the blade 36 and contact 38 flutter causing contact 38 to separate slightly from the contact bar 64 in spite of the strong attractive force exerted on the blade 36 by the magnet 60 (or 62), then protrusion 74 is urged by the spring action of leaf 72 through aperture 70 in bar 64 to maintain the engagement with the moving contact 38 so that there is no current interruption or arcing. Since the leaf spring member 72—74 is made of very high conductivity fine silver, and carries load for only a very short duration under such vibration conditions, it suffers no deleterious effects while protecting the switch in this way.

It will be apparent from the foregoing description that in my new contact construction 56 (and 58) the silver leaf spring 72—74 can be formed to definite size so the manufacturer can readily control the extent of protrusion of part 74 beyond the contact face 75 of bar 64 and likewise control the spacing between the opposed protruding parts 74 in a double throw switch assembly; and that this new contact construction readily permits close production control of tolerances for contact travel and stop positions, and like physical characteristics of the switch.

The mode of operation of the preferred novel snap acting switch combination of this invention including my new magnetic vibration control arrangement and new arc-preventing contact construction shown in the drawings is clear from the foregoing description thereof, and further discussion of operation is therefore believed unnecessary.

It will be apparent from the foregoing discussion that the novel snap acting switch combination of the present invention achieves the above-stated objectives, advantages and improvements, provides a superior switch for extreme vibration applications with a low cost economical construction and is adaptable to various existing snap switch designs.

The inventions may be embodied in other specific forms without departing from the spirit or essential characteristics thereof. The present embodiments are therefore to be considered in all respects as illustrative and not restrictive, the scope of the inventions being indicated by the appended claims rather than by the foregoing description, and all changes which come within the meaning and range of equivalency of the claims are therefore intended to be embraced therein.

What is claimed and desired to be secured by United States Letters Patent is:

1. A snap acting switch including a switch housing, and comprising within said housing: at least one fixed contact; at least one operating member of magnetic material with a movable contact thereon adapted to engage said fixed contact; spring means for operating said member with a snap action; actuating means for causing said operating member to be displaced with a sudden snap action relative to the fixed contact by said spring means; a magnet in said switch housing adjacent said magnetic operating member exerting a force on said member to urge it in the direction of the fixed contact to increase the contact pressure between it and said movable contact; said fixed contact having a main portion with a contact surface and with an aperture therethrough; and, a leaf spring secondary contact carried by said fixed contact and having a protrusion yieldably extending through said aperture.

2. A switch comprising: a fixed contact; at least one movable operating member with a contact thereon adapted to engage said fixed contact; means for exerting an attractive force on said operating member urging it in the direction of the fixed contact to increase the contact pressure between it and the movable contact; said fixed contact having a main portion with a contact surface disposed toward the movable contact, said main portion having an aperture therein; and, a leaf spring secondary contact of high conductivity disposed on a part of said main contact portion disposed away from said movable contact, said leaf spring having a protrusion thereon which extends through said aperture towards the moving contact and normally yieldably protrudes beyond said contact surface.

3. A switch as defined in claim 2 wherein said leaf spring secondary contact includes means for limiting the maximum extent of said protrusion beyond said contact surface of the main contact portion.

References Cited in the file of this patent

UNITED STATES PATENTS

| | | |
|---|---|---|
| 1,601,205 | Fisher | Sept. 26, 1926 |
| 1,879,349 | Lederer | Sept. 27, 1932 |
| 1,989,277 | Jeffrey | Jan. 29, 1935 |
| 2,190,847 | Persons | Feb. 20, 1940 |
| 2,273,671 | Ullberg | Feb. 17, 1942 |
| 2,277,111 | Johnson | Mar. 24, 1942 |
| 2,374,986 | Fetter | May 1, 1945 |
| 2,499,420 | Sakatos | Mar. 7, 1950 |
| 2,518,480 | Lilja | Aug. 15, 1950 |
| 2,521,277 | Aubert | Sept. 5, 1950 |
| 2,641,664 | Knutson | June 9, 1953 |
| 2,727,108 | Chisholm | Dec. 13, 1955 |
| 2,727,114 | Kesselring | Dec. 13, 1955 |
| 2,729,724 | Schleicher | Jan. 3, 1956 |
| 2,819,362 | Korsgren | Jan. 7, 1958 |

FOREIGN PATENTS

| | | |
|---|---|---|
| 924,491 | France | Mar. 10, 1947 |
| 283,895 | Switzerland | Nov. 1, 1952 |